(12) United States Patent
Kato et al.

(10) Patent No.: US 10,449,995 B2
(45) Date of Patent: Oct. 22, 2019

(54) HOLLOW RACK BAR AND METHOD OF MANUFACTURING THE HOLLOW RACK BAR

(71) Applicant: NETUREN CO., LTD., Tokyo (JP)

(72) Inventors: Takashi Kato, Tokyo (JP); Takashi Yamawaki, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 162 days.

(21) Appl. No.: 15/329,738

(22) PCT Filed: Jul. 28, 2015

(86) PCT No.: PCT/JP2015/003792
§ 371 (c)(1),
(2) Date: Jan. 27, 2017

(87) PCT Pub. No.: WO2016/017158
PCT Pub. Date: Feb. 4, 2016

(65) Prior Publication Data
US 2017/0203781 A1     Jul. 20, 2017

(30) Foreign Application Priority Data

Jul. 28, 2014   (JP) ................................ 2014-153372

(51) Int. Cl.
*B62D 3/12*     (2006.01)
*B21K 1/76*     (2006.01)
(Continued)

(52) U.S. Cl.
CPC .............. *B62D 3/126* (2013.01); *B21K 1/768* (2013.01); *B62D 5/0421* (2013.01);
(Continued)

(58) Field of Classification Search
CPC ................................ B21K 1/767; B21K 1/768
See application file for complete search history.

(56) References Cited

U.S. PATENT DOCUMENTS 4,573,399 A    3/1986  Wilson
4,598,451 A *  7/1986  Ohki ..................... B21K 1/767
                                                      29/893.3
(Continued)

FOREIGN PATENT DOCUMENTS

EP    0897767 A1    2/1999
EP    1747828 A1    1/2007
(Continued)

OTHER PUBLICATIONS

Office Action dated Oct. 11, 2018, issued in counterpart European Application No. 15756491.5. (5 pages).
(Continued)

*Primary Examiner* — Jason L Vaughan
(74) *Attorney, Agent, or Firm* — Westerman, Hattori, Daniels & Adrian, LLP

(57) ABSTRACT

Provided are a method of manufacturing a hollow rack bar including a rack portion that is engaged with a pinion gear and faces supported by a yoke easily and accurately, and the hollow rack bar. The hollow rack bar (10) includes: the rack portion (21) engaged with the pinion gear (29); and the supported faces (23) provided on a back side of teeth of the rack portion (21) and supported by the yoke (31). The rack portion (21) is formed by locating a toothed mold (39) on an outer face of a circular tube material, and inserting a cored bar (41) into the circular tube material to pressurize an inner face, thereby transferring a shape of the toothed mold (39). The supported faces (23) are formed by removal processing or deformation processing of a back side of the teeth rack portion (21) of the circular tube material.

11 Claims, 6 Drawing Sheets

(51) Int. Cl.
  *B62D 5/04* (2006.01)
  *F16H 25/22* (2006.01)
  *F16H 55/26* (2006.01)
(52) U.S. Cl.
  CPC ....... *B62D 5/0448* (2013.01); *F16H 25/2204* (2013.01); *F16H 55/26* (2013.01)

(56) References Cited

U.S. PATENT DOCUMENTS

| | | | |
|---|---|---|---|
| 5,862,701 | A | 1/1999 | Bishop et al. |
| 2001/0006000 | A1* | 7/2001 | Oka .................... B21D 17/02 72/356 |
| 2002/0044439 | A1* | 4/2002 | Shiokawa ............ B21K 1/767 362/37 |
| 2002/0174702 | A1* | 11/2002 | Yasuda ................ B21D 17/02 72/370.06 |
| 2003/0097894 | A1* | 5/2003 | Ozeki .................. B21K 1/767 74/422 |
| 2005/0072002 | A1* | 4/2005 | Kubota ................ B21K 1/767 29/893.34 |
| 2006/0016238 | A1* | 1/2006 | Shiokawa ............ B21D 17/02 72/370.21 |
| 2007/0034036 | A1* | 2/2007 | Omi ...................... B21J 9/025 74/457 |
| 2008/0184833 | A1* | 8/2008 | Dohmann .............. B21J 5/12 74/422 |
| 2008/0202270 | A1* | 8/2008 | Yamawaki ........... B21K 1/767 74/422 |
| 2008/0229803 | A1* | 9/2008 | Yamawaki ........... B21D 17/02 72/360 |
| 2008/0229856 | A1* | 9/2008 | Yamawaki ........... B21O 5/003 74/422 |
| 2012/0258329 | A1* | 10/2012 | Tanabe .................. B21K 25/00 428/600 |
| 2013/0340554 | A1* | 12/2013 | Nomura ................ F16H 55/26 74/422 |
| 2015/0276037 | A1* | 10/2015 | Yamawaki ............. B21K 1/768 74/640 |

FOREIGN PATENT DOCUMENTS

| | | |
|---|---|---|
| FR | 2530571 A1 | 1/1984 |
| JP | 9-506550 A | 6/1997 |
| JP | 2000-238650 A | 9/2000 |
| JP | 2001-151132 A | 6/2001 |
| JP | 2007-196253 A | 8/2007 |
| JP | 2007-253190 A | 10/2007 |
| JP | 2008-264874 A | 11/2008 |
| JP | 2011-144902 A | 7/2011 |
| JP | 2011-255834 A | 12/2011 |
| KR | 100870779 B1 | 11/2008 |

OTHER PUBLICATIONS

International Search Report dated Nov. 16, 2015, issued in counterpart International Application No. PCT/JP2015/003792 (5 pages, including appendix).

* cited by examiner

HOLLOW RACK BAR AND METHOD OF MANUFACTURING THE HOLLOW RACK BAR

TECHNICAL FIELD

The present invention relates to a hollow rack bar used for automobile power steering systems and a method of manufacturing the same.

BACKGROUND ART

Automobile power steering systems include the one wherein a concave or convex supported faces are provided on the back side of the rack teeth of a rack bar, and by pushing down on the supported faces with a yoke to support the back side of the rack bar, a pinion gear and the rack are made to be in well-engaged state (Patent Literature 1).

A solid rack bar is used for ordinary power steering systems. By forging a solid material, a rack portion and V-shaped or Y-shaped supported faces are formed, the supported faces are provided on the back side of the teeth of the rack portion (Patent Literature 2).

In the case of solid rack bar, since it is difficult to manufacture a variable rack by machining, wherein the rack tooth pitch and the shape change along the axial direction, the variable rack is made by forging.

Meanwhile, it is known that the weight of a power steering system can be reduced much substantially by using a hollow rack bar as shown in Patent Literature 3. In Patent Literature 3, by placing a toothed mold on the outer face of a circular tube material, and by inserting a cored bar to allow the inner face of the material to be under high pressure, the shape of the toothed mold can be transferred to the outer face to form the rack teeth with high precision.

CITATION LIST

Patent Literature

[PTL1] JP 2001-151132 A
[PTL2] JP H09-506550 A
[PTL3] JP 2008-264874 A

SUMMARY OF INVENTION

Technical Problem

Unlike the solid rack bar, it is difficult to manufacture a hollow rack bar by forging. For example, even if a rack portion is forged from the outer face, the gear teeth of the rack portion cannot be formed accurately into a desired shape due to deformation of the hollow. It is still more impracticable to accurately form both the rack portion and the faces supported by the yoke on the back side of the rack teeth portion, as in the case of Patent Literature 2.

It is difficult to form both the rack portion and the supported faces simultaneously or sequentially as described in Patent Literature 3. It requires great care since the shape and the load affect each other.

It is an object to the present invention to provide a method of manufacturing easily and accurately a hollow rack bar having a rack portion that is engaged with a pinion gear and faces supported by a yoke, and a hollow rack bar having such a rack portion and supported faces.

Solution to Problem

According to an aspect of the present invention, a method of manufacturing a hollow rack bar is provided. The method of manufacturing a hollow rack bar, having: a rack portion engaged with a pinion gear; and supported faces provided on a back side of the rack teeth portion and supported by a yoke, includes: forming the rack portion by locating a toothed mold on an outer face of a circular tube material, and inserting a cored bar into the circular tube material to pressurize an inner face of the circular tube material, thereby transferring a shape of the toothed mold, and forming the supported faces by removal processing or deforming processing of a back side of the rack teeth portion of the circular tube material.

Preferably an arc face of the circular tube material is removed so that the supported faces are flat.

Preferably the method further includes: forming a circularly continuous heat-treated layer by quenching and tempering.

Preferably quenching and tempering are performed over an entire thickness of a portion where the rack portion and the supported faces are provided.

According to an aspect of the present invention, a hollow rack bar is provided. The hollow rack bar includes: a rack portion engaged with a pinion gear; and supported faces provided on a back side of the rack teeth portion and supported by a yoke, wherein the supported faces are flat and provided to form portions thinner than surrounding areas, and a circularly continuous heat-treated layer is made by quenching and tempering in an area where the rack portion and the supported faces are provided.

Preferably the heat-treated layer is provided over an entire thickness of a portion where the rack portion and the supported faces are provided.

Preferably the hollow rack bar further includes a ball screw, for which an assist mechanism is mounted at a different position in an axial direction with respect to the rack portion and the supported faces.

Effects of Invention

According to the present invention, a method of manufacturing easily and accurately a hollow rack bar having a rack portion that is engaged with a pinion gear and faces supported by a yoke can be provided along with a hollow rack bar having such a rack portion and supported faces.

REFERENCE SIGNS LIST

Figure 1:
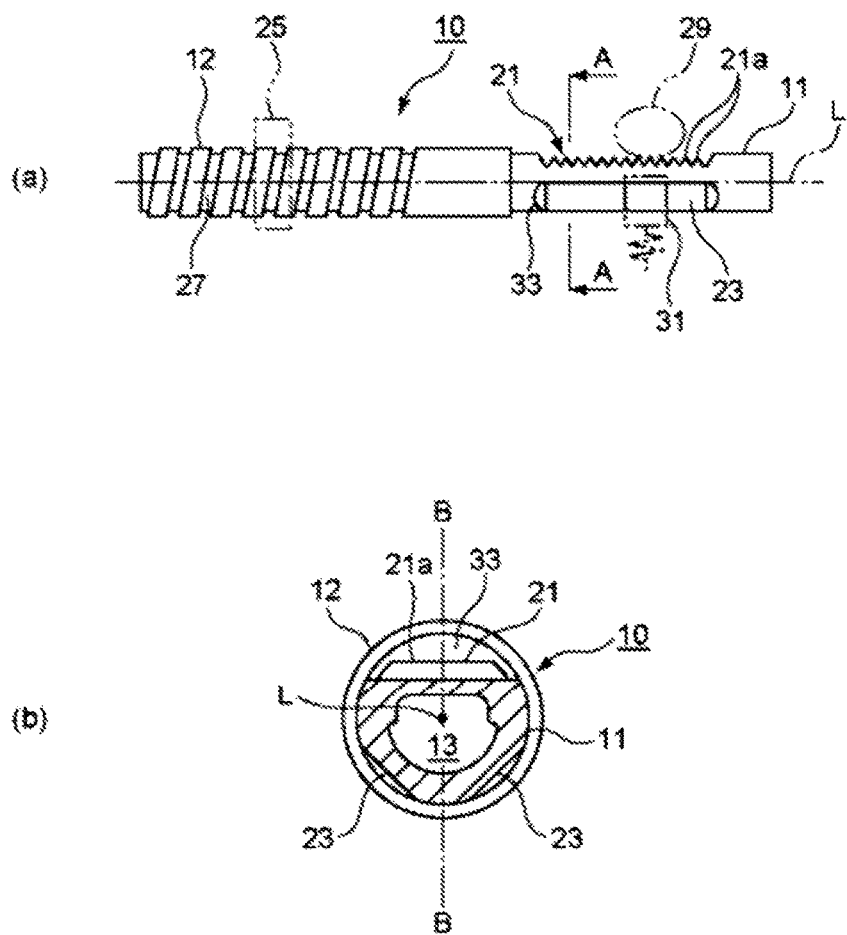
FIG. 1 shows a hollow rack bar according to a first embodiment of the present invention, wherein (a) is a side view, and (b) is a cross-sectional view taken along A-A in (a).

L: Axis
10: Hollow rack bar
11: Small-diameter portion
12: Large-diameter portion
21: Rack portion
21a: Rack tooth
23: Supported face
25: Ball nut
27: Ball screw
29: Pinion gear
31: Yoke
33: Slanted face
35: Circular tube
37: Flattened portion
39: Toothed mold
41: Cored bar
43: Tool
44: Grinding tool
45: Rack fixture
46: Fastening mold
47: Pressurizing face
48: Movable mold

DESCRIPTION OF EMBODIMENTS

The embodiments of the present invention will hereinafter be described by referring to the drawings.

Embodiment 1

A hollow rack bar according to the embodiment is used for a power steering system for automobiles.

FIG. 1 shows a hollow rack bar according to a first embodiment of the present invention, wherein (a) is a side view, and (b) is a cross-sectional view taken along A-A in (a).

As shown in FIG. 1, the hollow rack bar 10 includes a small-diameter portion 11, its outermost cross-section being in a mostly circular shape, and a large-diameter portion 12, its outermost cross-section being larger than that of the small-diameter portion 11 and in a mostly circular shape. The small-diameter portion 11 and the large-diameter portion 12 are provided at different positions in a direction along an axis L.

The small-diameter portion 11 includes a rack portion 21 formed on a part of its outer face, and supported faces 23 formed on its outer face opposite to the rack teeth portion 21. In the portion of the small-diameter portion 11 where the rack portion 21 and the supported faces 23 are provided, circular heat-treated layer is formed continuously by quenching and tempering. The entire thickness desirably constitutes the heat-treated layers. In this case, the layers can be formed over the entire thickness excluding the rack portion 21.

A ball screw 27 is provided in the large-diameter portion 12. When rotating parts of an assist mechanism are assembled in the ball screw 27, the balls of a ball nut 25 as rotating parts may roll. Once the ball nut 25 starts rotating, the stroke of the hollow rack bar 10 in the direction of the axis L is assisted.

The rack portion 21 of the small-diameter portion 11 is engaged with a pinion gear 29 of a steering shaft. A plurality of rack teeth 21a are provided and arranged in the direction of the axis L. A plurality of rack teeth 21a in a certain shape can be arranged at a constant pitch in the direction of the axis L. In this embodiment, the rack bar is a so-called variable rack bar whose pitch or/and shape change along the direction of the axis L.

The supported faces 23 of the small-diameter portion 11 are supported by a yoke 31.

The supported faces 23 are flat faces extending mostly in parallel with the axis L. The faces formed flatter than the arc face around the axis L may be allowed, but the faces are preferable to be plane.

In this embodiment, a pair of flat supported faces 23 is provided on the outer face on both sides of the rack portion 21 in the tooth width direction, and is slanted at an angle from 15 to 75 degrees with respect to the tooth width direction of the rack portion 21. The pair of supported faces 23 is provided symmetrically with respect to a virtual plane passing through the axis L and the center line of the rack portion 21 (line B-B in FIG. 1). The distance from each surface to the axis L is maintained constant. Since each supported face 23 is flat and the inner face is in a shape of an arc, each supported face 23 forms areas thinner than other areas.

On both ends of each supported face 23, slanted faces 33 are provided from the supported face 23 to the arc-shaped outer face. A step(s) may be formed instead of such the slanted faces 33. The outer face of the small-diameter portion 11 where the rack portion 21 and the supported faces 23 are not provided has a mostly circular cross section around the axis L.

According to the hollow rack bar 10 described above, the supported faces 23 are respectively provided on the outer face on both sides of the rack portion 21 in the tooth width direction, and the supported faces 23 are supported by the yoke 31. Consequently, rolling of the hollow rack bar 10 around the axis L can be prevented when force is applied to the hollow rack bar 10 in the radial direction around the axis L.

In this embodiment, in particular, the rotational force in the circumferential direction around the axis L is applied from the rotating parts of the assist mechanism to the hollow rack bar 10 when the stroke of the hollow rack bar 10 in the direction of axis L is assisted.

Consequently, the supported faces 23 are supported and pushed down by the yoke 31. As a result, rolling of the hollow rack bar 10 in the radial direction is suppressed, and good engagement between the rack portion 21 and the pinion gear 29 can be maintained.

The portion between the rack portion 21 and each supported face 23 of the hollow rack bar 10 is not in a constant shape. Acute angular portions or excessively constricted portions are thus prevented from being produced on the inner and outer faces between the rack portion 21 and the supported faces 23 slanted from 15 to 75 degrees with respect to the tooth width direction of the rack portion 21.

Consequently, the load by the processing can be reduced or the great care of processing can be minimized on production, and sufficient strength and durability can be ensured in use.

The hollow rack bar 10 has an outer face mostly in a shape of an arc around the axis L between the rack portion 21 and the supported faces 23, and between rack portions 21. The supported faces are provided inside the virtual circumferential surface corresponding to the outer face. No protruding portions exist over the entire back side of the teeth of the rack portion 21. Consequently, the outer shape around the axis of the hollow rack bar 10 can be made compact as far as possible, and the steering gear can be assembled easily. Furthermore, sufficient clearance to peripheral parts can be kept easily, there is no need to change peripheral parts design, and the peripheral parts can be designed compact.

Since the hollow rack bar 10 has a circular heat-treated layer formed by quenching and tempering in a region where the supported faces 23 and the rack portion 21 are provided, this ensures sufficient strength of the hollow rack bar 10. Sufficient strength can be assured even if the flat supported faces 23 are thin.

Figure 2:
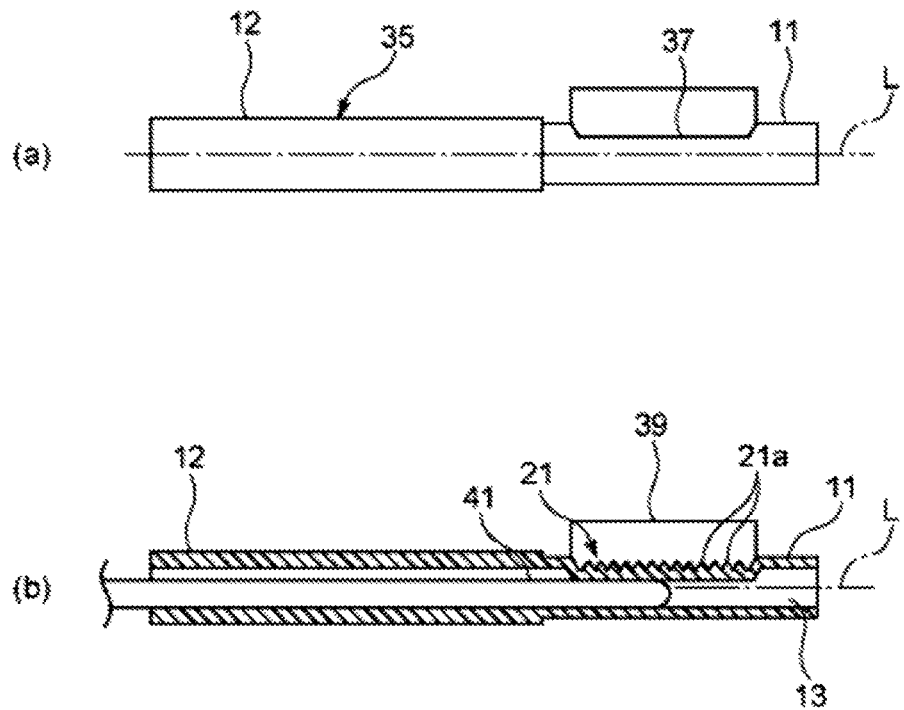
FIG. 2 is a view describing a method of manufacturing a hollow rack bar according to the first embodiment of the present invention, wherein (a) is a side view showing a flattening process, and (b) is a cross-sectional view showing a rack portion forming process.
Figure 3:
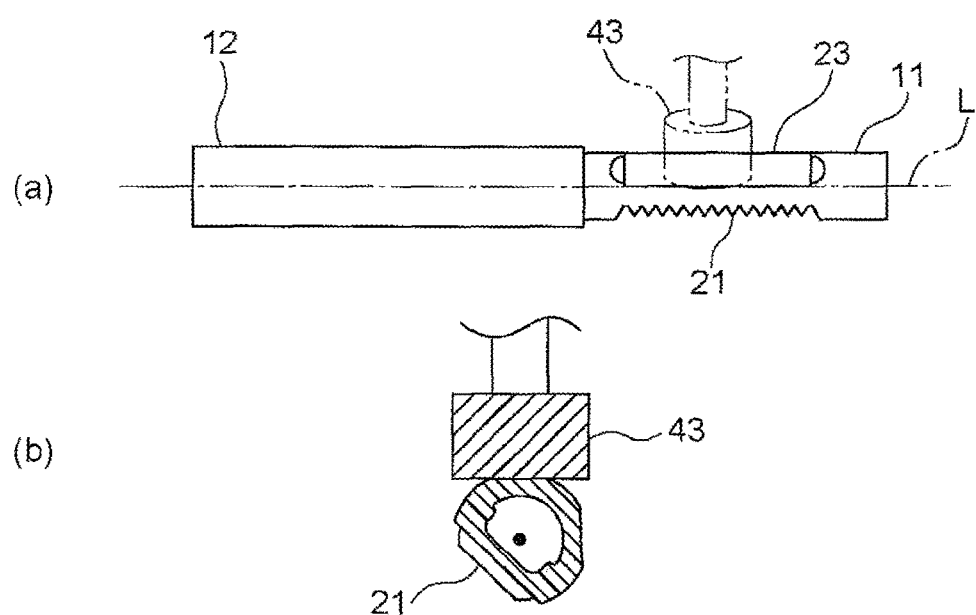
FIG. 3 is a view describing the method of manufacturing a hollow rack bar according to the first embodiment of the present invention, wherein (a) is a side view showing supported faces forming process, and (b) is a cross-sectional view showing the supported face in forming process.
Figure 4:
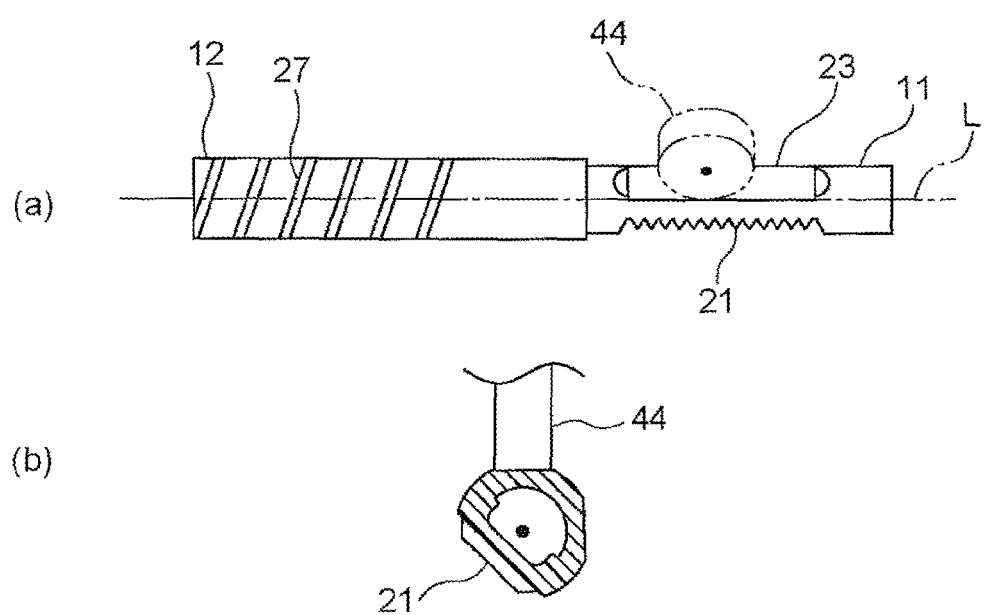
FIG. 4 is a view describing a method of manufacturing a hollow rack bar according to the first embodiment of the present invention, wherein (a) is a side view showing a finishing process, and (b) is a cross-sectional view showing the finishing process.

A method of manufacturing the hollow rack bar 10 will then be described. FIG. 2 is a view describing a method of flattening a hollow rack bar according to the first embodiment of the present invention, wherein (a) is a side view showing a flattening process, and (b) is a cross-sectional view showing a rack portion in forming process. FIG. 3 is a view describing the method of machining a hollow rack bar according to the first embodiment of the present invention, wherein (a) is a side view showing a supported face forming process, and (b) is a cross-sectional view showing the supported face. FIG. 4 is a view describing a method of grinding a hollow rack bar according to the first embodiment of the present invention, wherein (a) is a side view showing a finishing process, and (b) is a cross-sectional view showing the finishing process. The hollow rack bar 10 is manufactured by a method including the following processes using a quenchable tube material.

Firstly, as shown in FIG. 2(a), a small-diameter portion 11 and a large-diameter portion 12 are formed in the tube material as required, and a flattened portion 37 is formed by flat die on the outer face of the small-diameter portion 11 (flattening process). In this process, the outer and inner faces are flattened portion 37, other parts in the circumferential direction of the small-diameter portion 11 are maintained mostly in an arc shape, and the large-diameter portion 12 is maintained as a tube 35.

Next, as shown in FIG. 2(b), a toothed mold 39 is located on the outer face of the flattened portion 37, and then the circular tube 35 and the flattened portion 37 are fastened respectively. By inserting a cored bar 41 into the hollow 13 in the flattened portion 37 to pressurize the inner face, the shape of the toothed mold 39 is transferred onto the flattened portion 37 to form the rack portion 21 (rack portion forming process).

In this process, after fastening the toothed mold 39 in a shape reverse to that of the rack portion 21 in a state facing the flattened portion 37, the cored bar 41 is inserted repeatedly into the hollow 13 (between the inner surface of the flattened portion 37 and the opposite surface facing the inner surface), by sequentially replacing smaller cored bar 41 by a larger one 41.

The outer face of the flattened portion 37 is pressed to the toothed mold 39 while being deformed toward the outside to transfer the shape of a plurality of rack teeth 21a. This shape may be made to be a final shape, or an approximate shape that can be made to be the final shape easily after the heat treatment process.

It is desirable that the distance between the outer face opposite to the teeth of the rack portion 21 and the bottom of the teeth of the rack portion 21 be larger than the radius of the small-diameter portion 11.

As shown in FIG. 3(a) (b), the arc face on the back side of the teeth of the rack portion 21 is then made to undergo removal processing by cutting or grinding to form supported faces 23 (supported face forming process).

In this process, the portions on both sides of the rack portion 21 in the tooth width direction, of the arc face on the back of the teeth of the rack portion 21, are cut or ground using a tool 43 or 44 so that planes slanting from 15 to 75 degrees with respect to the tooth width direction of the rack portion 21 are formed.

Consequently, a pair of supported faces 23 is formed at positions corresponding to the arc-shaped inner face and symmetrically. This shape is allowed to be the final shape, or an approximate shape that can be finished into the similar final shape easily after the heat treatment process.

The outer and inner faces except for the rack portion 21 and the supported faces 23 in the small-diameter portion 11 are maintained mostly in a shape of an arc, and the outer face between each supporting face 23 and the rack portion 21 and that between supporting faces 23 are mostly in a shape of an arc.

Next, the region of the small-diameter portion 11 where the rack portion 21 and supported faces 23 are provided is made to undergo heat treatment such as quenching and tempering to form continuous heat-treated layers in a circular shape (heat treatment process). At this time, quenching and tempering may be performed for the entire thickness. It is also possible to form the heat-treated layers over the entire thickness excluding the rack portion 21. Conditions for heat treatment can be selected as required.

The strength of the entire wall thickness of the hollow small-diameter portion 11 can thus be increased.

Next, as shown in FIG. 4(a) (b), each portion is finished precisely by grinding, etc. In this case, grinding is performed using a grinding tool 44 after heat treatment to finish the rack bar into the final shape, and by grinding. A ball screw 27 is formed on the outer face of the large-diameter portion 12 (finishing process).

Figure 5:
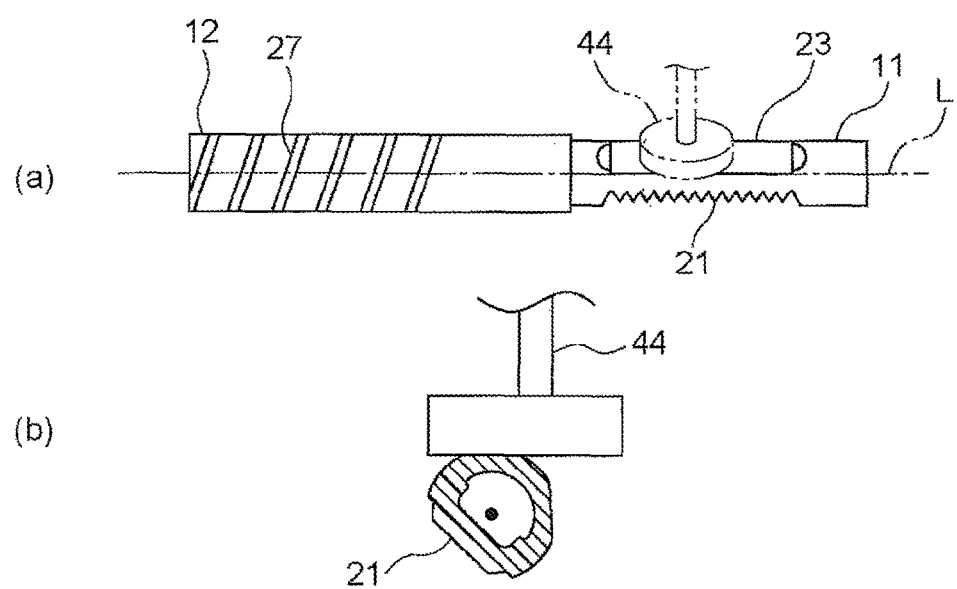
FIG. 5 is a view describing a modification of the first embodiment, wherein (a) is a side view showing a finishing process, and (b) is a cross-sectional view showing the finishing process.

In this grinding process, the supported faces 23 were finished by performing processing using the side peripheral face of the disk-shaped grinding tool 44. However, the method is not limited to this one. As shown in FIG. 5(a) (b), for example, it is also possible to finish the supported faces 23 by performing processing using the end face of the disk-shaped grinding tool 44.

By performing various processes such as thermal refining, surface treatment, sizing, and inspections in appropriate stages, in addition to the processes described above, the hollow rack bar 10 can be manufactured.

According to the method of manufacturing the hollow rack bar 10 described above, the supported faces 23 are formed after the rack portion 21 is formed by pressurizing the inner face by inserting the cored bar 41 into the circular tube material. Therefore, there is no risk of deforming the shape or decreasing the precision of the supported faces 23.

In other words, when the rack portion 21 is formed, by inserting the cored bar 41, not only the outline of the circular tube material can be expanded but also the shape of the toothed mold 39 can be transferred by pushing down the material to the toothed mold 39. Consequently, high pressure is applied to the circular tube material.

If supported faces 23 have been formed after forming the rack portion 21, the supported faces 23 and their surrounding areas deform due to deformation of the hollow 13 or formation of thin portions, for example.

By forming the rack portion 21 and then the supported faces 23, deformation of the supported faces 23 and their surrounding areas can be prevented, facilitating manufacture.

According to the manufacturing method in the embodiment, the arc-shaped outer face is removed to form the supported faces 23, the pressure high enough to cause deformation is not applied during the processing. The shape of the rack portion 21 can thus be maintained and degradation in precision can be prevented.

Furthermore, sharp edges such as those produced by pressing are not formed on the inner face on both sides in the tooth width direction of the rack portion 21, meaning that desired strength and durability can be ensured.

In addition, since a thick circular tube material hardly deforms, pressing can produce only limited shapes. However, with removal processing such as cutting, the shape and the size of the supported faces 23 can be set arbitrarily.

Consequently, the rack portion 21 and the supported faces 23 in desired shapes can be formed with high accuracy.

With the manufacturing method in this embodiment, since the arc face on the back side of the teeth of the rack portion 21 is made by removal processing to form the flat supported faces 23, thin portions are formed. However, the thickness changes gradually in accordance with the shape of the arc. That is why no local thinning occurs, ensuring desired strength of the hollow rack bar 10.

With the manufacturing method in this embodiment, the rack portion 21 and the supported faces 23 are formed, and then the entire thickness of the small-diameter portion 11 is made by quenching and tempering. As a result, the bending strength of the entire thickness of the hollow small-diameter portion 11 increases, thus improving the rigidity of the hollow rack bar 10. Sufficient bending strength can thus be kept even if the modulus of section is decreased by forming the supported faces 23.

Embodiment 2

A second embodiment will hereinafter be described.

In the first embodiment, the supported faces 23 are formed by performing removal processing such as cutting and grinding. In the second embodiment, the hollow rack bar 10 is manufactured in the same method as the first embodiment except that the supported faces 23 are formed by deformation processing such as pressing.

Figure 6:
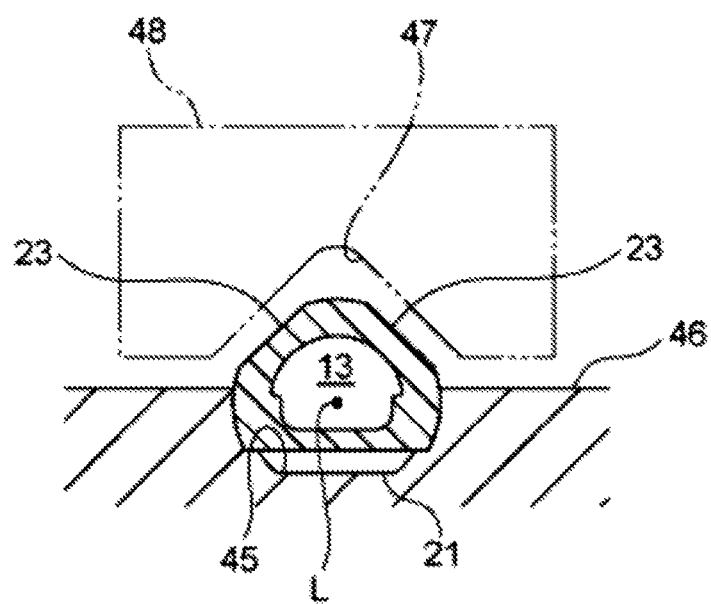
FIG. 6 is a view describing a method of manufacturing a hollow rack bar according to a second embodiment of the present invention, a cross-sectional view showing a supported face in deforming process.

FIG. 6 shows the process of forming the supported faces 23 by the manufacturing method in the second embodiment.

In this process, the rack portion 21 is formed in the circular tube material in the same method as the first embodiment, and then the rack portion 21 is maintained and fastened to a fastening mold 46 having a rack fixture 45.

By using a movable mold 48 having a V-shaped pressurizing face 47 formed in an angle corresponding to a pair of supported faces 23 to be formed, the arc-shaped outer face is pressurized and deformed on the back side of the teeth of the rack portion 21 to form the supported faces 23.

The tube wall on the back side of the teeth of the rack portion 21 is thus deformed to alter arc-shaped inner and outer faces into flat. The outer face is thus formed into the supported faces 23.

Then the hollow rack bar 10 can be manufactured in the same method as the first embodiment.

In the second embodiment as described above, the same operational effect as the first embodiment can be obtained.

In particular, in the second embodiment, the outer face of the hollow material forming the rack portion 21 is pressurized and deformed to form the supported faces 23. As a result, the volume having been decreased on the outer face enters the hollow 13.

Even if the shape of a part of the outer face is compressed, the shape of other part does not expand or protrude outside as excess thickness, unlike the case where a solid material is formed by forging.

As described above, the rack portion 21 and the supported faces 23 can be formed similarly by deformation processing. Therefore, it is easy to handle materials and equipment. In addition, since excess thickness is not produced on the outer face, there is no need to remove excess thickness after processing. Manufacture is thus facilitated, and wasting of the material can be prevented.

The embodiments described above can be modified as required within the scope of the present invention.

For example, the supported faces were formed into flat faces in the embodiments described above. However, the present invention is applicable not only to flat faces but also to other faces. For example, curved or bent faces smaller than the arc-shaped outer face of the small-diameter portion 11, other than the arc face around the axis L, are also allowed.

The embodiments described above are the cases where the supported faces 23 are formed so that the cross section perpendicular to the axis L becomes mostly V-shaped. However, it is also possible to form the supported faces 23 so that the cross section perpendicular to the axis L becomes mostly Y-shaped.

The hollow rack bar 10 used for electric power steering systems was described above. However, the hollow rack bar 10 will be used for hydraulic power steering systems.

A ball screw 27 was used for the large-diameter portion 12 in the above example. However, the present invention is also applicable to electric power steering systems of other types. A hollow rack bar without a ball screw 27 is also allowed.

The invention claimed is:

1. A method of manufacturing a hollow rack bar, having a rack portion configured to be engaged with a pinion gear and supported faces provided on a back side of a rack teeth portion and configured to be supported by a yoke, the method comprising:
    forming the rack portion by locating a toothed mold on an outer face of a circular tube material, and inserting a cored bar into the circular tube material to pressurize an inner face of the circular tube material, thereby transferring a shape of the toothed mold, and then
    forming the supported faces by removal processing or deforming processing of the back side of the rack teeth portion of the circular tube material.

2. The method of manufacturing the hollow rack bar as set forth in claim 1, wherein the supported faces are formed by removal processing, and an arc face of the circular tube material is removed so that the supported faces are flat.

3. The method of manufacturing the hollow rack bar as set forth in claim 2, further comprising:
    forming a circularly continuous heat-treated layer by quenching and tempering.

4. The method of manufacturing the hollow rack bar as set forth in claim 1, further comprising:
    forming a circularly continuous heat-treated layer by quenching and tempering.

5. The method of manufacturing the hollow rack bar as set forth in claim 4, wherein quenching and tempering are performed over an entire thickness of a portion where the rack portion and the supported faces are provided.

6. The method of manufacturing the hollow rack bar as set forth in claim 1, wherein the supported faces are formed by the removal processing.

7. The method of manufacturing the hollow rack bar as set forth in claim 6, wherein the removal processing comprises a cutting processing.

8. The method of manufacturing the hollow rack bar as set forth in claim 1, wherein the supported faces are formed by the deforming processing.

9. The method of manufacturing the hollow rack bar as set forth in claim 1, wherein, prior to the step of forming the rack portion by locating the toothed mold on the outer face of the circular tube material, the method further comprises forming a flattened portion on an outer face of the circular tube material in a position corresponding to the rack portion.

10. The method of manufacturing the hollow rack bar as set forth in claim 9,
    wherein the circular tube material includes a large diameter portion and a small diameter portion, and
    wherein the flattened portion is formed on the small diameter portion.

11. The method of manufacturing the hollow rack bar as set forth in claim 1,
    wherein the supported faces are formed by the deforming processing, and the deforming processing comprises pressurizing and deforming an arc face of the of the circular tube material on the back side of the rack teeth portion by using a V-shaped mold having an angle corresponding to the supported surfaces.

\* \* \* \* \*